UNITED STATES PATENT OFFICE.

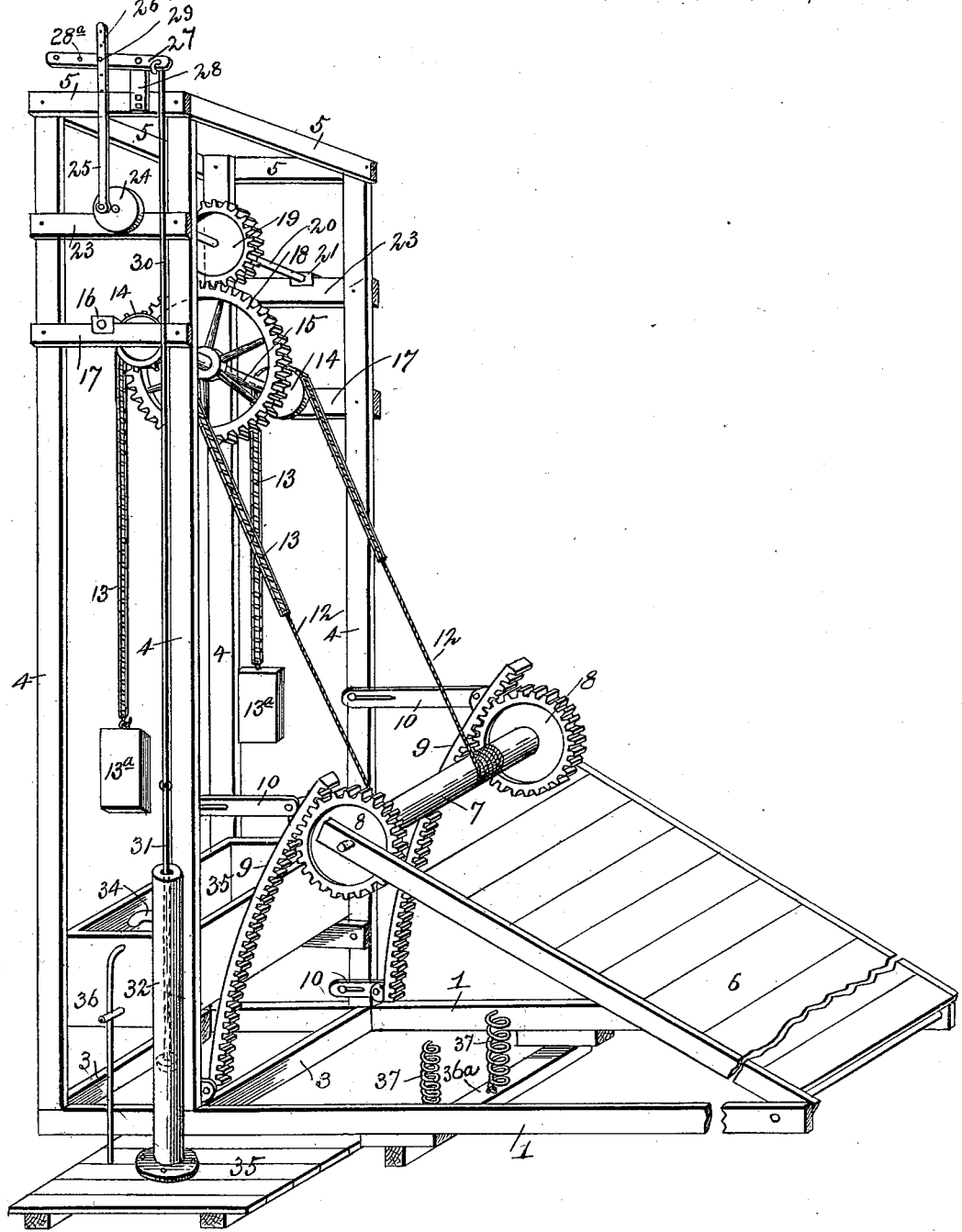

GEORGE W. PADGETT AND GEORGE HENDRYX, OF BLOOMINGTON, ILLINOIS.

AUTOMATIC PUMPING APPARATUS.

SPECIFICATION forming part of Letters Patent No. 554,950, dated February 18, 1896.

Application filed September 16, 1895. Serial No. 562,686. (No model.)

*To all whom it may concern:*

Be it known that we, GEORGE W. PADGETT and GEORGE HENDRYX, citizens of the United States, and residents of Bloomington, in the county of McLean and State of Illinois, have invented certain new and useful Improvements in Automatic Pumping Apparatus; and we do hereby declare that the following is a full, clear, and exact description of the invention, which will enable others skilled in the art to which it appertains to make and use the same, reference being had to the accompanying drawing, which forms a part of this specification.

Our invention relates to automatic pumping attachments for stock-pumps in which the pump is operated by the weight of an animal coming to a trough to drink; and its object is to provide an improved construction of the same which shall possess superior advantages with respect to efficiency and operation.

The invention consists in the novel construction and combination of parts hereinafter fully described and claimed.

In the accompanying drawing the figure represents a perspective view of an automatic stock-pump constructed in accordance with our invention.

In the said drawing, the reference-numeral 1 designates a rectangular frame, forming the base of the apparatus, consisting of two horizontal beams connected together near their rear ends by cross-pieces 3. Upon this base at the rear end are mounted four vertical standards or uprights 4 connected together at their upper ends by cross-pieces 5. Pivoted to the front end of said base is a platform 6, to the inner end of which is journaled a drum 7, provided at each end with cog-wheels 8, which engage with segment rack-bars 9, secured by means of plates 10 to the front uprights. Secured to the drums are two ropes 12, which in turn are connected with sprocket-chains 13, provided with weights 13$^a$, which chains pass over sprocket-wheels 14, mounted upon a shaft 15 journaled in boxes 16 secured to cross-pieces 17; also mounted on this shaft is a cog-wheel 18, which meshes with a pin 19, secured to a shaft 20, journaled in boxes 21, secured to cross-pieces 23. At one end this shaft 20 is provided with a crank-wheel 24, to which is pivoted a pitman 25, having a series of holes 26 near its upper end. This pitman is connected with a lever 27, pivoted to a plate 28, and is also formed with a series of holes 28$^a$. The purpose of these holes is to form an adjustable connection between the pitman and lever, so that the stroke of the pump-piston may be varied.

The numeral 29 designates a pin for connecting the pitman and lever together, and 30 the pump-rod, connected with the piston-rod 31 of a pump 32, which may be of any ordinary or suitable construction. The pump is provided with a spout 34, leading to a trough 35, provided with an overflow-pipe 36, passing down through platform 35 into the well. The numeral 36$^a$ designates a cross-beam secured to the base, provided with two vertical coiled springs 37, with which the platform engages when depressed. The purpose of these springs is to start the platform when the animal leaves the same.

The operation will be readily understood. When an animal walks upon the platform its inner end is depressed and the drum rotated through the medium of the cog-wheels engaging with the racks of the segment-bars. This will cause the ropes to be wound thereon and the gearing for operating the pump set in motion by the sprocket wheels and chains. As the animal leaves the platform, the latter will ascend and the weights on the sprocket-chains will operate the pumping mechanism. It will thus be seen that the pump is operated both by the falling and rising of the platform.

Having thus described our invention, what we claim is—

In an automatic pumping apparatus, the combination with the uprights, the pump, the pump-rod, the lever having a series of holes, the adjustable pitman connected therewith, the crank-wheel, the shaft and pinion, the cog-wheel meshing with said pinion, its shaft and the sprocket-wheels, of the weighted sprocket-chains passing over said wheels, the pivoted platform, the drum journaled to the front end thereof, with which said chains are connected, the cog-wheels at the ends of the drum, the segment rack-bars, and the coiled springs; substantially as described.

In testimony that we claim the foregoing as our own we have hereunto affixed our signatures in presence of two witnesses.

GEORGE W. PADGETT.
GEORGE HENDRYX.

Witnesses:
ADAM GUTHRIE,
CHARLES S. WATKINS.